(No Model.)

E. H. ROGERS.
PIPE STEM.

No. 381,170. Patented Apr. 17, 1888.

WITNESSES:
Geo. E. Greenleaf,
John C. Gallagher.

INVENTOR.
Elias H. Rogers.
BY
Julius Davies
ATTORNEY.

UNITED STATES PATENT OFFICE.

ELIAS H. ROGERS, OF DURHAM, CONNECTICUT.

PIPE-STEM.

SPECIFICATION forming part of Letters Patent No. 381,170, dated April 17, 1888.

Application filed December 30, 1887. Serial No. 259,427. (No model.)

*To all whom it may concern:*

Be it known that I, ELIAS H. ROGERS, a citizen of the United States, residing at Durham, in the State of Connecticut, have invented certain new and useful Improvements in Pipe-Stems, of which the following is a description.

My invention relates to an improvement in pipe-stems, and has for its object to prevent the nicotine and oily matter which collects at the bottom of the bowl from passing along the stem of the pipe into the mouth of the smoker, and to prevent saliva from flowing from the mouth of the smoker into the bowl of the pipe.

My invention consists in a peculiarly-constructed receptacle placed in the stem of the pipe to receive and retain the fluids and oily matter which are produced by smoking tobacco.

Figure 1:
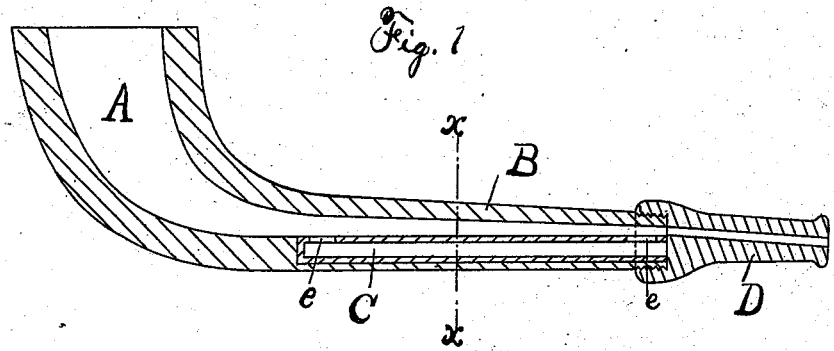
Figure 2:
Figure 3:
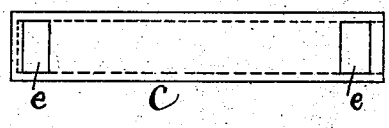
Figure 4:
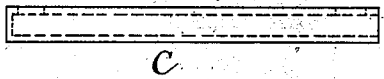
Figure 5:
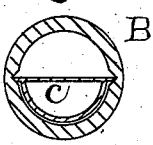

In the accompanying drawings, Figure 1 is a longitudinal section of a tobacco-pipe, showing my improved receptacle in place. Figs. 2, 3, and 4 are detailed views of the receptacle removed from the pipe; and Fig. 5 is a cross section of the stem of the pipe on the line X X, Fig. 1.

Referring to the drawings, A denotes the bowl of the pipe, which is constructed in the usual manner.

B represents the stem of the pipe containing my improved receptacle C, and D the mouth-piece of the pipe. The receptacle C is formed in the shape of a small tube semicircular in cross section, with the upper side and the end nearest to the bowl closed. The receptacle is placed in the stem in such a manner as to allow the smoke to pass above its flat upper side.

The hole in the stem for the passage of the smoke from the bowl enters the portion of the stem containing the receptacle above its flat upper side. The flat upper side of the receptacle may, as shown in Fig. 5, be slightly wider than the body of the tube to allow the projecting edges to enter suitable grooves on the inside of the stem to prevent the tube from rotating. This upper side has an orifice, $e$, at or near each end extending across it.

The oily matter containing nicotine and other injurious subtances which would collect at the bottom of the bowl passes into the orifice $e$ nearest to the bowl, and it is thus prevented from reaching the mouth of the smoker. Any saliva which may pass from the mouth of the smoker through the mouth-piece will flow into the orifice nearest to the mouth-piece, and will thus be prevented from reaching the bowl of the pipe.

It is evident that one orifice may be sufficient for both purposes, but the use of two is preferred.

The mouth-piece D is screwed onto the end of the stem in the usual manner and closes the open end of the receptacle.

My improved pipe-stem can be manufactured cheaper than other forms of pipe-stems provided with a nicotine-catcher, and by removing the mouth-piece the receptacle may be readily withdrawn for cleaning or other purposes.

I claim as new and desire to secure by Letters Patent—

1. In combination with a pipe-stem having the smoke-passage, the tubular nicotine-receptacle situated on the lower side of such passage, so that the smoke passes along over its top, and having in such top an opening near each end, substantially as and for the purpose specified.

2. In combination with a pipe-stem having a smoke-passage, the tubular nicotine-receptacle situated on the lower side of such passage, so that the smoke passes along over its top, and having in such top an opening near each end to let the nicotine through, with its end toward the pipe-bowl closed and its other end open, and a mouth-piece on the stem adapted to close the open end of the receptacle, substantially as and for the purpose specified.

ELIAS H. ROGERS.

Witnesses:
PHILIP POND,
J. W. BISHOP.